Nov. 11, 1947.  M. M. SEELOFF  2,430,787
FLASH WELDER CONSTRUCTION
Filed June 7, 1945  6 Sheets-Sheet 1

Inventor
MELVIN M. SEELOFF
By Francis J. Klempay
Attorney

Fig. 2.

Inventor
MELVIN M. SEELOFF
By Francis J. Klempay
Attorney

Nov. 11, 1947. M. M. SEELOFF 2,430,787
FLASH WELDER CONSTRUCTION
Filed June 7, 1945 6 Sheets-Sheet 4

Inventor
MELVIN M. SEELOFF
By Francis J. Klempay
Attorney

Nov. 11, 1947.　　M. M. SEELOFF　　2,430,787
FLASH WELDER CONSTRUCTION
Filed June 7, 1945　　6 Sheets-Sheet 5

Inventor
MELVIN M. SEELOFF
By Francis J. Klempay
Attorney

Patented Nov. 11, 1947

2,430,787

UNITED STATES PATENT OFFICE 2,430,787

FLASH WELDER CONSTRUCTION

Melvin M. Seeloff, Warren, Ohio, assignor to The Taylor-Winfield Corporation, Warren, Ohio, a corporation of Ohio Application June 7, 1945, Serial No. 598,096

26 Claims. (Cl. 219—4)

This invention relates to electric resistance flash-butt welders and more particularly to various improved mechanical and electrical features of construction of welding machines of this type. A principal object of the invention is the provision of an improved frame arrangement for electric resistance flash-butt welders wherein the construction of the component parts of the machine and the assembly of these parts to produce the completed machine is greatly facilitated. Thus, this object of the invention is concerned with the production of flash-butt welding machines in a more economical and expeditious manner. A supplemental object of the invention as regards the general organization or frame arrangement of the welder is the provision of a manufacturing system whereby maximum use is made of standardized components in producing welders of different sizes and capacities. A further supplemental object in the subject category is the increasing of the strength and rigidity of the welding machine whereby the machine may be subjected to longer periods of severe service conditions without deterioration or appreciable misalignment in any of the operative parts of the assembly.

Another object of the invention is the provision of improved means to support and guide the movable platen of the assembly which, in accordance with usual practice, is utilized to support a die or clamp for retaining one of the two parts to be welded together. Further, the invention seeks to provide an improved mode of electrically insulating the movable platen from the fixed platen of the machine and of avoiding decrease in the effectiveness of this insulation which may be caused by the lodgement of spelter or other debris whereby the machine will have better and consistent characteristics as regards electrical losses.

A further object of the invention is the provision, in an electric resistance welding machine of the flash-butt type, of an improved arrangement for electrically coupling one of the terminals of the secondary loop of the welding transformer with the movable platen or with the current conductive dies or clamps mounted thereon whereby inductive losses in the electrical system are materially reduced enabling larger currents to reach the work while held in a machine of any normally rated capacity. Inasmuch as the welding transformer secondary pads are normally fixed while one of the platens of the machine is movable in relation thereto a flexible electrical connection must be provided to allow for such relative movement and experience has indicated that laminated looped bands are best for this purpose. According to the present invention such connecting bands are retained but additional current conductive fittings are employed, such fittings being specially formed to enable bands of shorter length and of a smaller loop to be employed while yet allowing required freedom of relative movement and imposing a minimum of fatigue on the respective laminations of the bands. Further, such fittings are "nested" within the copper masses carried by the movable platen or secured to the transformer pad as the case might be to provide an overall close electrical coupling between the parts to thus greatly minimize the inductive losses in the system.

Yet another object of the invention is the provision of improved arrangements for detachably mounting the work piece retaining clamps or dies in the fixtures of a flash-butt welding machine and of improved arrangements for conducting cooling fluid through such clamps or dies. It is desirable that these clamps or dies be readily interchangeable to condition the machine for making a different product and it is usually necessary too that clamps or dies be provided with passages and be connected with conduits for circulating cooling fluid through them. Heretofore, these requirements necessitated the manual time consuming task of disconnecting and reconnecting the cooling fluid conductive conduits of the welding machine from and to the dies and clamps. This arrangement is further objectionable in that the exposed flexible conduits employed are sometimes in the way of the ready manipulation of the machine and are easily damaged by contact with sharp or hot metal pieces. These various objections are overcome by the present invention by providing fluid conducting passages in the fixtures themselves, such passages having openings adapted to register with corresponding openings provided in the passages formed in the separable clamps or dies so that upon application of the clamps or dies to the fixtures a complete passage for the circulation of the cooling fluid is established. At the points of interconnection between the various openings effective fluid sealing means of improved design is provided.

The above and other objects and advantages of the invention will become apparent upon consideration of the following detailed specification and the accompanying drawing wherein there is illustrated certain preferred embodiments of the invention.

Figure 4:
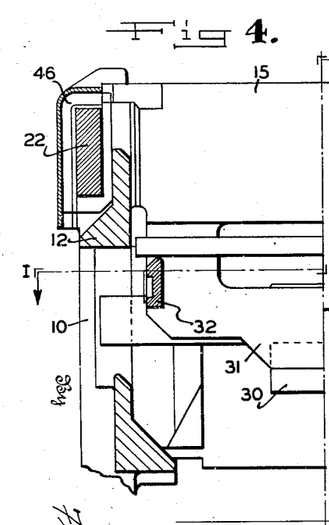
Figures 4, 5 and 6 are transverse sectional views taken along the lines IV—IV, V—V, VI—VI of Figure 1.
Figure 5:
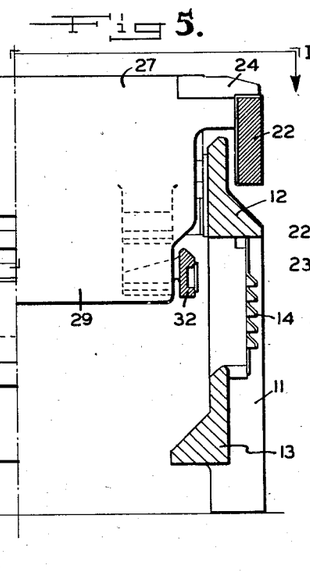

In the drawing reference numerals 10 and 11 designate the principal side frame plates of the welding machine and, as shown, these plates are assembled in spaced, parallel, upright relation. Each of the frame members 10 and 11 consists essentially of a pair of longitudinally spaced pedestals interconnected by integral upper and lower struts 12 and 13, respectively, defining an opening to provide for the ready access into the body of the machine, and, in practice, such opening may be closed by a louvered cover plate 14. Securely bolted to the top edge portions of the frame members 10 and 11 and positioned at one end thereof is the fixed platen 15 of the welding machine which is, in accordance with usual practice, adapted to carry a fixture mounting a stock clamp or die and which mounts a copper fitting 16 having a portion lying in the plane of the top surface of the platen 15 and another integral portion connected with the pad or pads constituting one of the terminals of the secondary loop of the welding transformer. This transformer, indicated schematically at 17 is mounted below the fixed platen 15 and may be supported by one or both of the frame members 10 and 11 through any suitable expedient. The side edges of the platen support 15 are of considerable depth as indicated in Figure 4 and since these side edges are also rigidly secured to the inner surfaces of the side frames 10 and 11 by suitable means, not shown, a rigid box-like assembly results.

The opposite ends of the side frame members 10 and 11 are tied together by a header member 18 which is bolted, or otherwise suitably secured, to the top and inner surfaces of the side frame members 10 and 11. Further, frame member 18 is keyed to each of the side frame members 10 and 11 as shown at 19 and 20, respectively. It should be apparent that the four principal pieces 10, 11, 15, and 18 constitute the frame and main body of the welder when assembled and that by interlocking these parts in the manner explained above a rugged but easily assembled frame is made possible.

Referring now to Figure 2, 4, 5, and 6, it will be observed that a horizontal shoulder 21 is provided on each of the pedestals of the side frame members 10 and 11 for slideably supporting the longitudinally extending side bars 22, one of which is positioned on either side of the machine.

An insulating wear plate 23 partially received in a recess may be positioned on each of the shoulders 21 to actually slideably support the bars 22. These pads 23 are preferably of graphite impregnated fibrous or Bakelite material and as such are suited for the purpose of slideably supporting the bars 22 and of insulating the bars from the frame comprised of the side members 10 and 11.

Figure 1:
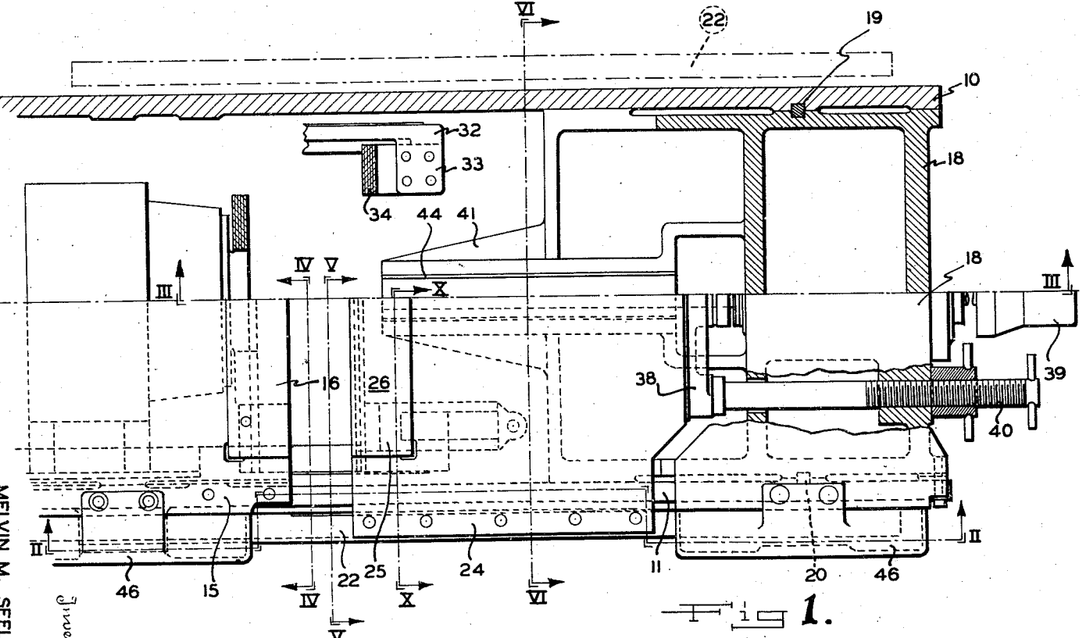
Figure 1 is a plan view, partly in horizontal section, of a flash-butt welding machine constructed in accordance with the principles of the invention, the locale of the section being indicated on Figure 4.
Figure 10:
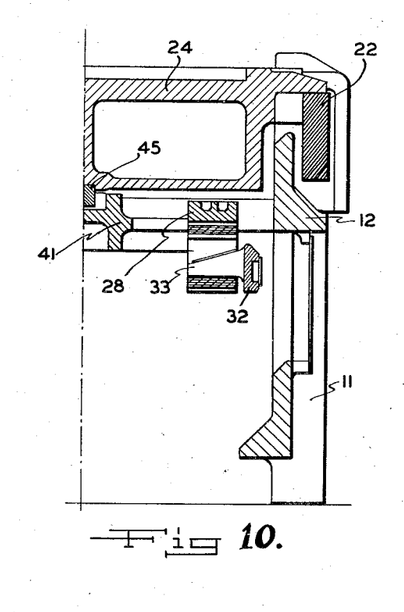
Figure 10 is a transverse section taken along the lines X—X of Figure 1.

The side rails 22 support the movable platen of the machine and, as shown in Figures 1 and 10 this platen, designated by reference numeral 24, spans the two side rails 22 and is rigidly bolted to the top surface thereof. Inwardly of the rails 22 and the side frame members 10 and 11 is a copper fitting 25 having a portion 26 lying in the plane of the top surface of the platen 24, an integral portion 27 overlying the front edge of platen 24, integral transversely spaced arms 28, and an integral downwardly extending skirt 29 in general continuation of the portion 27. The copper fitting 25 is rigidly connected to the movable platen 24.

Bolted to the pad or pads 30 constituting the other terminal of the welding transformer secondary is a copper conductor having a plate-like center portion 31 extending transversely of the welder and at either side edge of the plate 31 is an integral forwardly extending arm 32. At the forward end of each of the arms 32 is an inwardly directed lug 33 and as is apparent from Figures 2, 3 and 10 the lugs 33 are positioned substantially below the arms 28 of the current conductor fitting 25 which is carried by the platen 24. Arms 28 are interconnected with the lugs 33 by means of short looped laminated bands 34 so that the arms 28 can move longitudinally with respect to the arms 32 while a current connection is maintained between the welding transformer and the conductor 25. In this manner the welding transformer secondary is operatively connected with the current conductors 16 and 25 carried with the fixed and movable platens, respectively, of the welding machine. Skirt 29 of the fitting 25 projects downwardly between the two arms 32 and forms a flash guard for the bands 34. It should be observed that the total effective length of the secondary conductor loop for conveying the welding current to the work through the fittings 16 and 25 is substantially less than in constructions heretofore proposed for the same purpose and therefore the inductive losses in this secondary circuit are of minimum value. Further, since a greater part of the path is made up of large masses of solid copper the conductivity of the circuit is at the maximum and the circuit is accordingly capable of transmitting very large amperages without excessive resistance losses.

Figure 3:
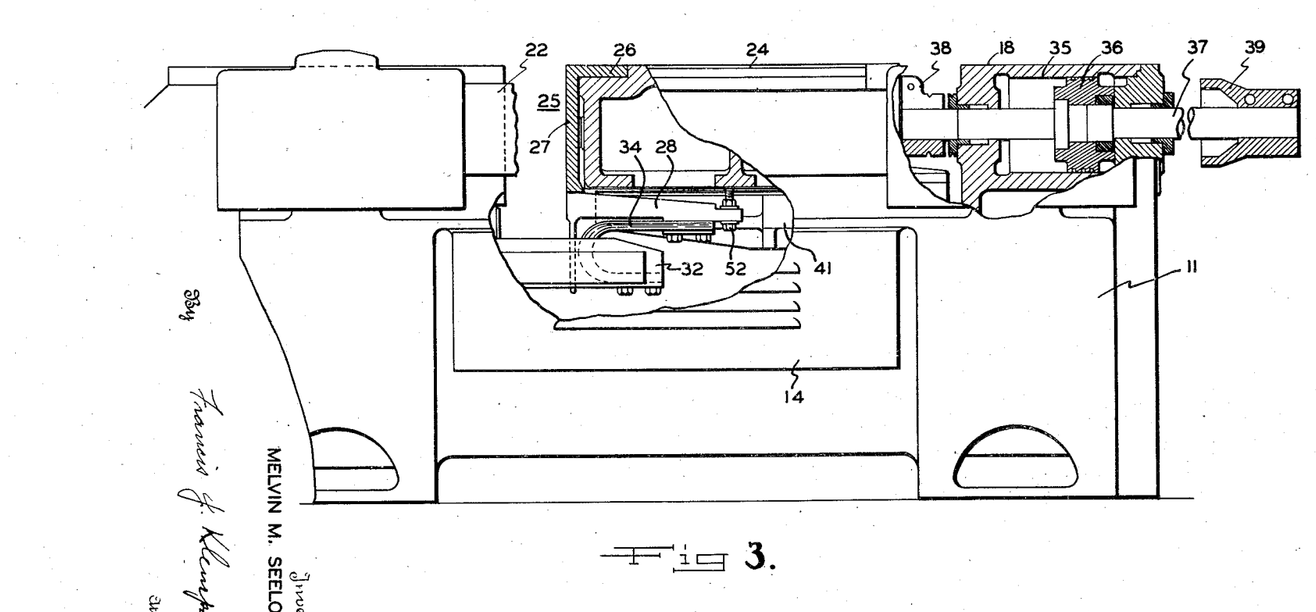

Referring now to Figures 1 and 3, header 18 is provided with a bore 35 constituting a cylinder in which is inserted a piston 36 to actuate the slideable platen 24. For this purpose a piston rod 37 is incorporated in the structure and has its inner end rigidly connected with a coupling plate 38 which is attached to but insulated from the platen 24. A collar 39 adjustably mounted on the outer projecting end of the rod 37 limits inward movement of the piston 36 and consequently the approach of the movable platen 24 to the fixed platen 15 of the machine. Outward movement of the platen 24 is limited by a pair of screws 40, one positioned on each side of the machine, having screw-threaded engagement with the header 18 and adapted to be abutted by the outer wings of the platen 38.

Figure 6:
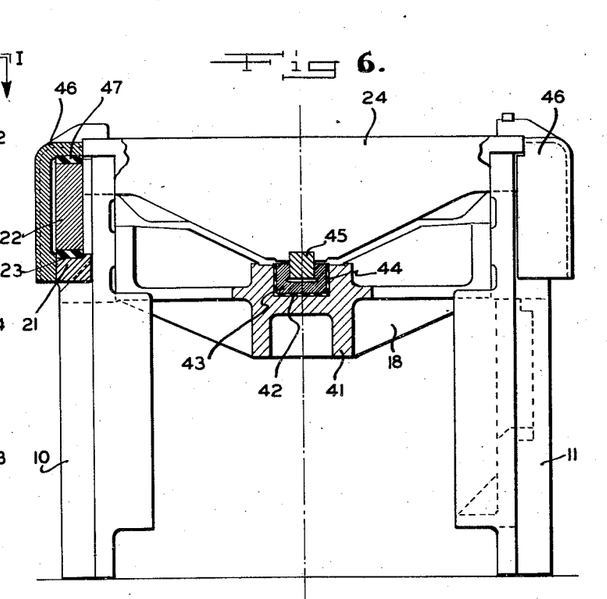

Header 18 is also provided with an integral longitudinally extending cantilevered beam 41 in the upper longitudinal surface of which is formed a trough 42 (Figure 6). Mounted in the trough 42 is a guide bar 43, the side and bottom surfaces of which are insulated from the trough 42 by means of insulation strips 44. Extending centrally and longitudinally along the bottom of the platen 24 is a bar 45 which snugly but slideably fits within the channel formed in guide bar 43 and which is rigidly attached to the platen 24 at a number of longitudinally spaced points. Members 43 and 45 therefore constitute an effective center guide which maintains the longitudinal alignment of the platen 24 with respect to the platen 15 under all conditions of service. The parts of this guide are, as suggested by the drawing, of sufficient mass and strength to avoid any appreciable lateral misalignment or deflection even if the machine be eccentrically loaded at time of maximum pressure or upset.

To resist upward thrust of the side rails 22 I provide a cap member 46 for each of the pedestal portions of the side frames 10 and 11. Secured in each of the cap members 46 is a horizontally disposed strip 47 overlying the top edge of the retained side rail 22. The material of strips 47 is the same as the material of the pads 23, being of a suitable graphite impregnated fibrous or Bakelite material which has the effect of electrically insulating the rails 22 from the frame of the machine while yet allowing sliding movement of the rails without undue friction. Cap members 46 are rigidly bolted through the flanges of the platen 15 and header 18 to the upper edges of the side frames 10 and 11.

A desirable attribute of the machine of this invention is that the top of the machine is for all practical purposes entirely flat thus facilitating the design and installation of the work clamping fixtures which may be utilized in connection with the machine. Further, the flat top facilitates the loading and unloading of the machine in production operations and prevents damage to any part of the machine by the careless handling of tools or the work. This construction, however, places the line of thrust from the cylinder below the axis of weld so that at the time of upset there is a substantial moment tending to arch the machine upwardly. Such forces, however, are most effectively parried by the construction and arrangement of the machine of this invention in that the moments of inertia of the primary structural members 10, 11 and 22 are greatest and are of high value about horizontal axes extending transversely of the machine.

Figure 2:
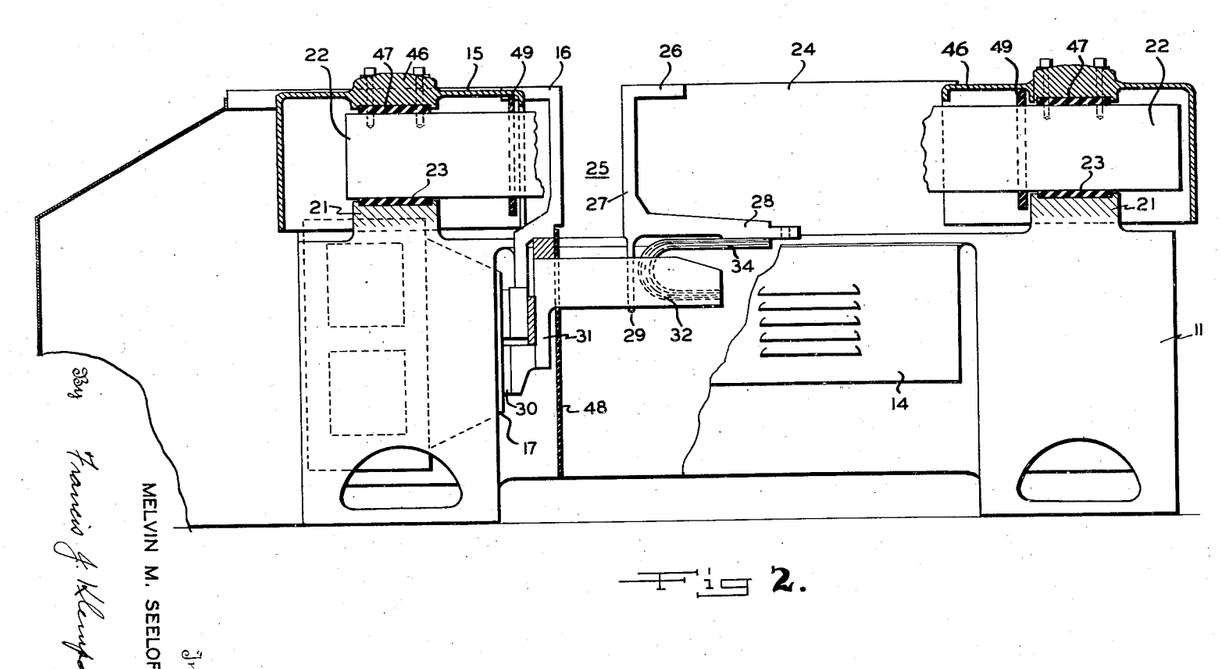
Figures 2 and 3 are front elevations, partly in section, of the machine of Figure 1, the locales of the sections being indicated by lines II—II, III—III, respectively, of Figure 1.

To protect the transformer 17 and the secondary circuit connections thereof from flash and spelter which may be thrown out from the point of weld I provide a shield plate 48 extending downwardly from the copper fitting 16 in general continuation of the vertical face of this fitting. Plate 48 projects downwardly between the arms 32 of the transformer secondary circuit connector 31. Shields 49 are provided about the side rails 22 at points spaced inwardly of the pedestals 21, all as shown in Figure 2. These shields 49 are for the purpose of preventing scale, spelter, etc., from working outwardly along the rails and into the slidable bearing connections provided between the rails and the wear plates 23 and 47. As such, shields 49 completely encompass the rails, being carried thereby, and are positioned as close to the pedestals as possible while yet allowing unrestricted longitudinal sliding movement of the rails. As shown, the cap members 46 are of sufficient length to contain the shields 49 and the ends of the rails 22 in any position of the latter.

Figure 11:
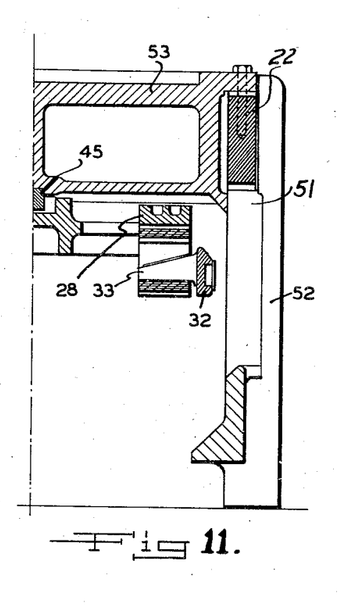
Figure 11 is a sectional view corresponding in general with Figure 10 but of a modified form of construction.

Referring to the modification of the invention illustrated in Figure 11, reference numeral 52 indicates a modified form of side plate for the principal frame of the machine and this modified frame embodiment is characterized principally by a substantially flush outer surface extending vertically from the bottom to the top plane of the machine. This further enhances the appearance of the machine and contributes to its usability in that the avoidance of protuberances along the side of the machine facilitates the movements of the operator attending the machine. In this modification the side rails 22 are positioned closer together, being located inwardly of the planes of the principal masses of the frame plates 52. In this embodiment rails 22 rest on shoulders or pedestals 51 formed on the inner surfaces of the plates 52 and, as in the case of the embodiment first described, insulating wear plates are again employed to slideably mount the rails. The change in design necessitates also obvious changes in detail in the construction of the movable platen structure and such modified platen is shown at 53, in Figure 11.

Figures 7, 8, 9:
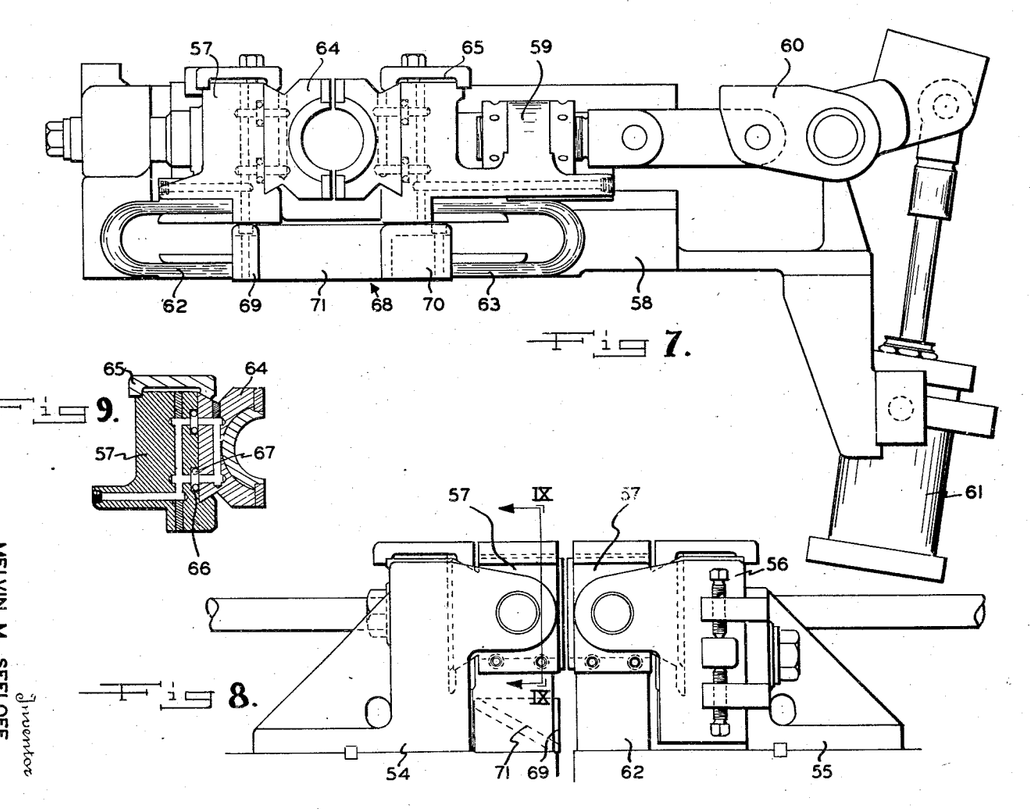
Figures 7 and 8 are side and front views, respectively, of assembled fixtures and stock clamps constructed according to the principles of the invention and which may be utilized in connection with the structure of Figures 1 through 6.
Figure 9 is a detailed section taken along the lines IX—IX of Figure 8.

Referring now to Figure 8, reference numeral 54 designates a stock clamp support which may be rigidly bolted to the top surface of the fixed platen 15, for example, as will be readily understood by those familiar with the art while reference numeral 55 is a stock clamp support which may be rigidly bolted to the movable platen 24, for example, so that upon relative movement of the platens the stock pieces carried by these respective supports will be moved relative to each other in completing the welding cycle. Pivotally connected to and carried by the support 55 is a fitting 56 which in turn adjustably mounts one of the copper alloy blocks 57. The block 57 which is carried by the fitting 56 is electrically connected with the top section 26 of the copper secondary circuit connector 25 (which is carried by the movable platen 24) by means of one of the looped laminated bands 62. Another of the blocks 57 is adjustably carried by the support 54 and on the rear portion of the support 54 (58—Figure 7) is slideably mounted a copper alloy block or casting which is electrically connected with the copper fitting 16 by means of the looped laminated band 63. One of the laminated bands 62 electrically connects the block 57 but is carried by the support 54 with the fitting 16. The clamping die mounting block 59 is arranged to be moved by the toggle 60 which in turn is actuated by the cylinder 61, the latter overhanging and depending downwardly along the rear side of the welding machine when the clamping fixtures are assembled in operative position on the welding machine.

In accordance with the initially described object of facilitating the interchanging of the stock clamps or dies and the elimination of flexible cooling fluid carrying conduits which interfere with ready stock manipulation I provide fluid circulating passages in the positions of the blocks 57 and 59 which passages are provided by drilling and plugging and arranged generally as shown in Figures 7, 8 and 9. An inlet port and an outlet port is provided in the portion of the front face of the block 57 and in the lower portion of the rear face of the rear block 59 and it should be apparent that conduits connected with these parts will lie in lower out-of-the-way positions. Each of the blocks 57 and 59 is intended to carry a clamping die and such a die is shown at 64. Quick detachable connecting means comprised of the clamp plates 65 forming releasable dovetailed interlocks are employed to hold the dies 64 in the blocks 57 and 59. In the faces of the blocks 57 and 59 which contact surfaces of the dies 64 there are cut circular recesses having passageways leading therefrom which communicate through the passages previously described with the inlet and outlet ports of these mounting blocks. The dies themselves also have fluid circulating passages therein with openings extending to the surfaces which engage the blocks 57 and 59, such openings being in register with the circular recesses (66) previously described. Constrained in each of these recesses is an annular grommet 67 having an unrestrained axial thickness somewhat greater than the depth of the recesses so that upon the application of the dies to the holders and the tightening up thereof fluid-tight interconnections are automatically provided between the dies and holders as will be understood. Grommets 67 may assume a wide variety of forms—for example, conventional rubber "O" rings or rubber rings having axially spaced radially inward feather edges. By constructing the various dies (for clamping stock pieces of varying sizes and shapes) with standardized mounting surfaces and fluid inlet and outlet ports the stock clamping fixtures of the machine may be quickly changed over to handle stock pieces of different sizes and shapes. This feature coupled with the elimination of substantial portions of the flexible cooling fluid conducting conduits constitutes an advantageous improvement in clamping fixtures for flash welding machines.

In flash welding machines heretofore, considerable difficulty was encountered in respect to the scale and spelter building up on the laminated bands which electrically connect the die holders with the copper of the platens. This difficulty is overcome by the present invention by positioning a small box-like shield 68 intermediate the lower inner ends of the bands and directly below the clamping dies. This shield is secured to the platen in any convenient manner and consists of a box section 69 located closely underneath the block 57, a box section 70 positioned closely underneath the block 59, and an intermediate inclined web 71 down which the flashed off scale and spelter may slide into the interstice between the platens.

It should now be apparent that I have provided improved features of construction especially applicable to electric resistance flash-butt welders which accomplishes objects initially set out. The resulting machine is, in general, quite compact, rugged and durable and is economical to manufacture particularly since it consists of a minimum number of principal parts each of which is comparatively simple in nature and therefore easily formed and machined. Moreover, many of the parts as the side frame plates and side rails, for example, may be utilized for a number of different sized machines, enabling various machines to be readily assembled from a minimum stock of parts. The insulation and electrical characteristics, in general, of the machine are materially improved so that substantially higher peak currents may be obtained in machines of given ratings. The design of the component parts of the machine is such that maximum utilization results from the masses of metals employed while the proper alignment of the movable parts remains constant over long periods of service. It should be understood however that many changes may be made in the above specifically described embodiments without departing from the spirit or scope of the invention and reference should therefore be had to the appended claims in determining the scope of the invention.

What I claim is:

1. An electric resistance flash-butt welding machine comprising in combination a pair of spaced parallel upright plate-like frame members, a fixed platen rigidly interconnecting said frame members and having surfaces abutting the top and inner side surfaces of said frame members, a header member housing a cylinder rigidly interconnecting said frame members at points longitudinally spaced from said fixed platen and having surfaces abutting the top and inner side surfaces of said frame members, a longitudinally extending side rail slideably mounted for longitudinal movement on each of said frame members, a movable platen supported on said side rails, a piston in said cylinder having a rod engaging said movable platen, and means to guide the longitudinal movement of said movable platen.

2. An electric resistance flash-butt welding machine comprising in combination a pair of spaced parallel upright plate-like frame members, a fixed platen rigidly interconnecting said frame members and having surfaces abutting the top and inner side surfaces of said frame members, a header member rigidly interconnecting said frame members at points longitudinally spaced from said fixed platen and having surfaces abutting the top and inner side surfaces of said frame members, a longitudinally extending side rail slideably mounted for longitudinal movement on each of said frame members, a movable platen rigidly connected to and carried by said side rails, means on said header member to move said movable platen, and means to guide the longitudinal movement of said movable platen.

3. An assembly according to claim 2 further characterized in that said means to guide comprises a longitudinally elongated guide carrying member formed integrally with said header member and a cooperating longitudinally extending guide member carried by said movable platen.

4. An electric resistance flash-butt welding machine comprising in combination a pair of spaced parallel frame members each having a pair of longitudinally spaced pedestal sections interconnected by an integrally formed web section, a fixed platen rigidly interconnecting the pedestal sections at one end of said frame members, a header member rigidly interconnecting the pedestal sections at the opposite end of said frame members, a side rail slideably mounted on the pedestal sections of each of said frame members, a movable platen rigidly secured to and carried by said side rails, means on said header member to move said movable platen longitudinally, and means to guide the longitudinal movement of said movable platen.

5. An assembly according to claim 4 further characterized in that said side rails are electrically insulated from said pedestal sections, said moving means and said guiding means also including electrical insulating means whereby said movable platen is effectively insulated from said fixed platen, frame members, and header member.

6. An assembly according to claim 4 further including a friction reducing but electrical insulating pad on each of said pedestals to slideably support said rails, and a cap member for each of said pedestals, each of said cap members mounting a friction reducing but electrical insulating pad to overlie the top surfaces of said rails and being rigidly secured to said frame members.

7. An electric resistance flash-butt welding machine comprising in combination a pair of spaced parallel plate-like frame members disposed on edge, a fixed platen structure rigidly interconnecting said frame members adjacent one end thereof, a header structure rigidly interconnecting the opposite ends of said frame members, a pair of spaced parallel side rails each slideably mounted for longitudinal movement in one of said frame members, a movable platen rigidly connected to and carried by said side rails, and means to guide the longitudinal movement of said movable platen.

8. An assembly according to claim 7 further including upper and lower friction reducing but electrical insulating wear pads carried by said frame members and engaging the end portions of the upper and lower surfaces of said side rails whereby said movable platen is effectively insulated from said frame members.

9. An electric resistance flash-butt welding machine comprising in combination a pair of spaced parallel plate-like frame members disposed on edge, a fixed platen structure rigidly interconnecting adjacent ends of said frame members, a header structure rigidly interconnecting the opposite ends of said frame members, each of said frame members having a pair of longitudinally spaced shoulders on its inner side surface, a longitudinally extending rail associated with each of said frame members and having a lower surface slideably supported on said shoulders for longitudinal movement, and a movable platen rigidly secured to and carried by said rails.

10. An assembly according to claim 9 further including means to guide the longitudinal movement of said movable platen, friction reducing but electrical insulating wear plates interposed between said rails and said shoulders, surfaces associated with said frame members for resisting upward thrust of said rails, and friction reducing but electrical insulating wear plates interposed between said rails and said surfaces.

11. An electric resistance flash-butt welding machine comprising in combination a pair of spaced parallel plate-like frame members disposed on edge, a fixed platen structure rigidly interconnecting adjacent ends of said frame members, a header structure rigidly interconnecting the opposite ends of said frame members, a longitudinally extending rail slideably mounted on each of said frame members, a movable platen rigidly attached to and carried by said rails, means carried by said header structure to move said platen, said header structure having an integral cantilevered longitudinally extending guide supporting member, a guide on said supporting member, and a cooperating longitudinally extending guide member rigidly secured to said platen whereby said platen is guided along its longitudinal path of travel.

12. An electric resistance flash-butt welding machine comprising in combination a pair of spaced parallel plate-like frame members disposed on edge, a fixed platen structure rigidly interconnecting adjacent ends of said frame members, a header structure rigidly interconnecting the opposite ends of said frame members, a longitudinally extending rail slideably mounted on but electrically insulated from each of said frame members, a movable platen rigidly attached to and carried by said rails, means carried by said header structure to move said platen, said header structure having an integral trough extending longitudinally toward said fixed platen structure, an elongated guide trough mounted in said first mentioned trough but electrically insulated therefrom, and an elongated guide rail rigidly connected to said movable platen for sliding movement in said guide trough.

13. An electric resistance flash-butt welding machine comprising a rigid frame, a pair of spaced parallel side rails slidably mounted for longitudinal movement on said frame, a fixed platen carried by said frame and a movable platen spanning said rails intermediate the ends thereof and securely fastened thereto, and electrical insulating wear plates slideably guiding said rails while restraining vertical movement thereof.

14. An electric resistance flash-butt welding machine comprising in combination a rigid frame, a fixed platen on said frame, a pair of spaced parallel side rails slideably mounted for longitudinal movement on said frame, a movable platen spanning the center portions of said rails and rigidly secured thereto, and electrical insulating wear plates engaging end portions of said rails for slideably mounting said rails on said frame.

15. Apparatus according to claim 14 further including a longitudinally extending guide member carried by said frame underneath said movable platen, a cooperating longitudinally extending guide member carried by the underpart of said movable platen for operative engagement with said first mentioned guide member whereby said movable platen is guided along its longitudinal path of travel, and insulating means mounting at least one of said guide members whereby said movable platen is electrically insulated from said frame.

16. An electric resistance flash-butt welding machine comprising a frame bearing a normally fixed platen, a movable platen slideably mounted on said frame for longitudinal movement toward and away from said normally fixed platen, the means slideably mounting said movable platen on said frame being operative to electrically insulate said platen from said frame, and additional means for guiding the longitudinal movement of said movable platen comprising interlocking longitudinally extending guide members on said frame and movable platen, said additional means including insulating means to electrically insulate said movable platen from said frame.

17. In a flash-butt welding machine having a normally fixed platen and a movable platen and a welding transformer positioned therebelow, a current conductive plate having a portion lying in the top plane of said fixed platen and a downwardly extending integral portion connected with one of the secondary terminals of said transformer, a second current conductive plate having a portion lying in the top plane of said movable platen and having an integral downwardly extending portion and a pair of spaced arms extending outwardly of said downwardly extending portion in a direction away from said first mentioned platen, a yoke-like current conductive fitting mounted on the opposite terminal of the transformer secondary and having a pair of arms extending generally parallel with said first mentioned arms, and looped laminated bands interconnecting the arms of said fitting with the arms of said second platen, said bands being looped in a direction toward said first mentioned platen whereby said arms and bands have a nested arrangement.

18. In an electric resistance flash-butt welding machine, relatively movable platens having adjacent faces each covered with a plate of highly conductive metal one of which is connected directly with a secondary terminal pad of the welding transformer, the other of said plates having a pair of integral arms extending in a direction away from the said one of said plates, a current conductive fitting mounted on the other secondary terminal pad of said transformer and having a pair of arms extending generallly parallel with said first mentioned arms, and looped laminated bands interconnecting the outer free ends of the arms on said fitting with the outer free ends of the arms on the said other plate, said bands being positioned in nested relation with respect to both said arms.

19. In an electric resistance welding machine, a current conductive die holder, a current conductive work piece clamping die detachably mounted on said holder, the body of said die having cooling fluid passages therein with an inlet port and an outlet port in the face thereof which is applied against said holder; said holder having cooling fluid conducting passages therein with an outlet port and an inlet port in the face thereof which is applied against said die to register with the inlet and outlet ports, respectively, of said die; and terminals for said passages through said holder positioned remote from said faces for connection with flexible fluid conducting conduits.

20. Apparatus according to claim 19 further including recesses in one of said faces about said ports, and axially yieldable fluid-sealing grommets retained in said recesses to provide fluid-tight interconnections between the ports of said die with the ports of said holder upon application of the die to the holder.

21. An electric resistance flash-butt welding machine comprising in combination a rigid frame, a pair of spaced rails longitudinally slideable on said frame in longitudinally spaced bearings mounted on said frame, a fixed platen on said frame, a movable platen spanning the center portions of said rails and rigidly secured thereto, and flash shields encircling said rails individually at points spaced inwardly of said bearings.

22. An electric resistance flash-butt welding machine having a platen and a pair of transversely spaced die holders electrically connected to a current conductive bar extending along an edge of said platen by means of a pair of looped laminated bands positioned substantially below the respective holders, a flash guard positioned on said bar between said bands, said guard having box-like end portions covering the inner ends of the lower reaches of said bands and an inclined center portion sloping in a direction toward the adjacent edge of said bar and platen.

23. An electric resistance flash-butt welding machine comprising in combination a rigid frame, a pair of spaced parallel side rails, said frame having rail supporting shoulders on opposite sides thereof and disposed in longitudinal relation to slideably support said pair of said rails, a normally fixed platen carried by said frame and a movable platen spanning said rails intermediate the ends thereof and securely fastened thereto, and separable cover plates having side and top walls positioned over the end portions of said side rails and rigidly secured to said frame whereby there is provided in conjunction with said shoulders sockets for the slideable reception of the end portions of said side rails.

24. A machine according to claim 23 further including wear plates of insulating material mounted on said shoulders and other wear plates of insulating material mounted on the inner surfaces of the top walls of said cover members.

25. An electric resistance flash-butt welding machine having horizontally disposed relatively movable platens each carrying a plate of highly conductive metal, one of said plates being directly connected with a secondary terminal pad of a welding transformer positioned immediately below one of said platens, a horizontally disposed current conductive yoke connected to the other secondary terminal pad of said transformer, a horizontally disposed current conductive yoke carried by the other of said platens and electrically connected to the other of said plates, the opposite arms of the first mentioned yoke lying in close parallel relation with the opposite arms of the other of said yokes, integral inwardly directed lugs on the arms of one of said yokes, and a pair of flat looped current conductive flexible bands interconnecting said lugs with the arms of said second mentioned yoke, said bands being positioned in nested relation with respect to the opposite arms of said yokes.

26. An electric resistance flash-butt welding machine having relatively movable platens each mounting a plate of highly conductive metal and having a welding transformer with secondary terminal pads positioned immediately below one of said platens, means electrically connecting the plate carried by said one of said platens with one of said pads, an outwardly disposed current conductive arm mounted on the other of said pads, an outwardly disposed current conductive arm carried by the other of said platens and electrically connected to the plate mounted thereon, said arms being parallel but offset with respect to each other in a vertical direction, an integral lug on the outer end of one of said arms disposed in substantial vertical alignment with the portion of the other of said arms, and a flexible looped current conductive band interconnecting said lug with said portion of the other arm, the loop of said band being in nested relation to said arms.

MELVIN M. SEELOFF.

REFERENCES CITED

The following references are of record in the file of this patent:

UNITED STATES PATENTS

| Number | Name | Date |
| --- | --- | --- |
| 1,654,563 | Taylor | Jan. 3, 1928 |